US010133538B2

(12) United States Patent
McLaren et al.

(10) Patent No.: US 10,133,538 B2
(45) Date of Patent: Nov. 20, 2018

(54) SEMI-SUPERVISED SPEAKER DIARIZATION

(71) Applicant: SRI International, Menlo Park, CA (US)

(72) Inventors: Mitchell Leigh McLaren, Sunnyvale, CA (US); Aaron Dennis Lawson, San Jose, CA (US); Harry Bratt, Mountain View, CA (US)

(73) Assignee: SRI International, Menlo Park, CA (US)

( * ) Notice: Subject to any disclaimer, the term of this patent is extended or adjusted under 35 U.S.C. 154(b) by 212 days.

(21) Appl. No.: 14/671,918

(22) Filed: Mar. 27, 2015

(65) Prior Publication Data

US 2016/0283185 A1 Sep. 29, 2016

(51) Int. Cl.
| G06F 3/0484 | (2013.01) |
| G06F 3/16 | (2006.01) |
| G10L 25/27 | (2013.01) |
| G06F 17/30 | (2006.01) |
| G10L 25/54 | (2013.01) |
| G10L 17/04 | (2013.01) |
| G10L 17/06 | (2013.01) |

(52) U.S. Cl.
CPC .......... G06F 3/165 (2013.01); G06F 3/0484 (2013.01); G06F 17/30743 (2013.01); G10L 25/27 (2013.01); G10L 25/54 (2013.01); *G10L 17/04* (2013.01); *G10L 17/06* (2013.01)

(58) Field of Classification Search
CPC .................................................. G06F 3/0484
USPC ........................................................ 715/716
See application file for complete search history.

(56) References Cited

U.S. PATENT DOCUMENTS

| 5,606,643 | A | * | 2/1997 | Balasubramanian .. G11B 27/28 704/243 |
| 5,655,058 | A | * | 8/1997 | Balasubramanian ... G10L 15/04 704/236 |
| 5,659,662 | A | * | 8/1997 | Wilcox ................ G06K 9/6219 704/243 |
| 5,839,103 | A | * | 11/1998 | Mammone .............. G10L 17/10 704/232 |
| 6,404,925 | B1 | * | 6/2002 | Foote ................ G06F 17/30746 348/480 |
| 6,434,520 | B1 | * | 8/2002 | Kanevsky ......... G06F 17/30746 704/243 |

(Continued)

OTHER PUBLICATIONS

Alexander et al., "Voice Carving—Forensic Application of Automatic Speaker Segmentation", available in 2010, downloaded from «http://www.oxfordwaveresearch.com/our-r-and-d/articles-and-abstracts/», 9 pages.*

*Primary Examiner* — Reza Nabi
*Assistant Examiner* — Daniel Rodriguez
(74) *Attorney, Agent, or Firm* — Hickman Palermo Becker Bingham LLP

(57) ABSTRACT

An audio file analyzer computing system includes technologies to, among other things, localize audio events of interest (such as speakers of interest) within an audio file that includes multiple different classes (e.g., different speakers) of audio. The illustrative audio file analyzer computing system uses a seed segment to perform a semi-supervised diarization of the audio file. The seed segment is pre-selected, such as by a human person using an interactive graphical user interface.

20 Claims, 7 Drawing Sheets

(56) References Cited

U.S. PATENT DOCUMENTS

| | | | |
|---|---|---|---|
| 6,774,917 B1* | 8/2004 | Foote | G06F 17/30814 707/E17.028 |
| 7,039,951 B1* | 5/2006 | Chaudhari | G10L 17/06 340/5.84 |
| 7,861,169 B2* | 12/2010 | Hull | G06F 3/1204 358/1.15 |
| 8,326,623 B2* | 12/2012 | Fujii | G06F 17/30746 704/231 |
| 8,392,004 B2* | 3/2013 | Matsuda | G06F 3/165 700/94 |
| 8,600,741 B2* | 12/2013 | Talwar | G10L 15/07 381/26 |
| 9,275,635 B1* | 3/2016 | Beaufays | G10L 15/32 |
| 9,571,652 B1* | 2/2017 | Zeppenfeld | H04M 3/523 |
| 9,871,606 B1* | 1/2018 | Carroll | H04H 60/56 |
| 2002/0028021 A1* | 3/2002 | Foote | G06K 9/00758 382/224 |
| 2002/0080286 A1* | 6/2002 | Dagtas | G06F 17/30787 348/738 |
| 2004/0064314 A1* | 4/2004 | Aubert | G10L 25/87 704/233 |
| 2004/0111261 A1* | 6/2004 | Chaudhari | G10L 17/08 704/236 |
| 2004/0167767 A1* | 8/2004 | Xiong | G10L 25/00 704/1 |
| 2004/0181747 A1* | 9/2004 | Hull | G06F 3/1204 715/202 |
| 2005/0004690 A1* | 1/2005 | Zhang | G10L 25/48 700/94 |
| 2005/0068568 A1* | 3/2005 | Hart | H04N 1/00222 358/1.15 |
| 2006/0065102 A1* | 3/2006 | Xu | G06F 17/30743 84/600 |
| 2006/0133666 A1* | 6/2006 | Liu | G06K 9/6228 382/159 |
| 2006/0149693 A1* | 7/2006 | Otsuka | G06F 17/30787 706/20 |
| 2007/0071206 A1* | 3/2007 | Gainsboro | H04M 3/2281 379/168 |
| 2007/0276733 A1* | 11/2007 | Geshwind | G06Q 30/02 705/14.49 |
| 2007/0297682 A1* | 12/2007 | Zhang | G06K 9/4614 382/224 |
| 2008/0300867 A1* | 12/2008 | Yan | G10L 17/26 704/207 |
| 2009/0037179 A1* | 2/2009 | Liu | G10L 13/033 704/260 |
| 2009/0043573 A1* | 2/2009 | Weinberg | G10L 17/06 704/223 |
| 2010/0070276 A1* | 3/2010 | Wasserblat | G10L 15/18 704/243 |
| 2010/0198598 A1* | 8/2010 | Herbig | G10L 15/07 704/240 |
| 2011/0082874 A1* | 4/2011 | Gainsboro | G06F 17/30398 707/769 |
| 2011/0258547 A1* | 10/2011 | Symons | G06F 3/04817 715/723 |
| 2011/0320197 A1* | 12/2011 | Conejero | G06F 17/3002 704/235 |
| 2012/0029668 A1* | 2/2012 | Kim | G11B 27/007 700/94 |
| 2012/0095764 A1* | 4/2012 | Jeon | G10L 15/1822 704/246 |
| 2012/0131088 A1* | 5/2012 | Liu | G06K 9/00979 709/203 |
| 2012/0155663 A1* | 6/2012 | Weinberg | H04M 3/2281 381/59 |
| 2012/0185068 A1* | 7/2012 | Eppolito | G11B 27/034 700/94 |
| 2012/0253794 A1* | 10/2012 | Chun | G10L 21/007 704/201 |
| 2012/0263285 A1* | 10/2012 | Rajakumar | G10L 17/00 379/189 |
| 2013/0144414 A1* | 6/2013 | Kajarekar | G10L 17/02 700/94 |
| 2013/0166295 A1* | 6/2013 | Shriberg | G10L 17/02 704/243 |
| 2014/0039890 A1* | 2/2014 | Mundt | G10L 19/167 704/236 |
| 2014/0088961 A1* | 3/2014 | Woodward | G10L 15/22 704/235 |
| 2014/0095166 A1* | 4/2014 | Bell | G10L 25/54 704/270 |
| 2014/0172426 A1* | 6/2014 | Aratsu | G10L 21/0208 704/235 |
| 2014/0195236 A1* | 7/2014 | Hosom | G10L 17/18 704/249 |
| 2014/0201631 A1* | 7/2014 | Pornprasitsakul | G06F 3/0484 715/716 |
| 2014/0247926 A1* | 9/2014 | Gainsboro | H04M 3/2281 379/88.01 |
| 2014/0297280 A1* | 10/2014 | Verma | G10L 17/02 704/246 |
| 2014/0337027 A1* | 11/2014 | Ide | G10L 17/14 704/245 |
| 2015/0112682 A1* | 4/2015 | Rodriguez | G10L 17/06 704/249 |
| 2015/0149165 A1* | 5/2015 | Saon | G10L 15/063 704/232 |
| 2015/0227510 A1* | 8/2015 | Shin | G10L 15/04 704/2 |
| 2015/0279372 A1* | 10/2015 | Papierman | G10L 17/22 704/273 |
| 2015/0356974 A1* | 12/2015 | Tani | G10L 17/04 704/239 |
| 2015/0381801 A1* | 12/2015 | Rajakumar | G10L 25/48 379/88.01 |
| 2016/0019889 A1* | 1/2016 | Alvarez Guevara | G10L 15/08 704/254 |
| 2016/0086599 A1* | 3/2016 | Kurata | G10L 15/063 704/243 |
| 2016/0093315 A1* | 3/2016 | Kikugawa | G10L 21/10 704/270 |
| 2016/0124596 A1* | 5/2016 | Doerring | G06F 3/0484 715/723 |
| 2016/0142787 A1* | 5/2016 | Mohamed | H04L 67/24 725/53 |
| 2016/0180852 A1* | 6/2016 | Huang | G10L 17/005 704/246 |
| 2016/0182851 A1* | 6/2016 | Girgensohn | H04N 5/765 386/230 |
| 2016/0321029 A1* | 11/2016 | Zhang | G06F 3/165 |
| 2017/0134819 A9 | 5/2017 | Mohamed | H04L 67/24 |
| 2018/0012604 A1* | 1/2018 | Guevara | G10L 15/08 |
| 2018/0027351 A1* | 1/2018 | Cartwright | H04M 3/56 381/303 |

* cited by examiner

SEMI-SUPERVISED SPEAKER DIARIZATION

BACKGROUND

Speaker diarization refers to the technical field of using a computing system to execute mathematical algorithms (e.g., machine learning algorithms) to identify, within a single digital audio file, segments of audio that correspond to different speakers and linking segments from the same speaker. Whereas speaker segmentation may refer simply to the task of identifying different speaker turns (e.g., conversation changes from one speaker to the next), the end result of diarization may also be used in combination with automatic speaker recognition technology to identify (name) the speaker associated with each of the different-speaker segments. Conventional speaker diarization approaches typically seek to segment the entire file; i.e., to identify all changes in speaker turns and all speakers that occur within the audio file. For example, speaker diarization has been used to automatically annotate speaker turns in TV and radio transmissions and, with the aid of automatic speech recognition technology, provide automatic transcription of "who said what" in conference meetings, where the same had been traditionally performed manually by hand. However, most research in the area of automated speaker diarization has focused on the use of unsupervised machine learning techniques.

Speech activity detection (SAD) can be used as a pre-processing step, in order to pre-identify audio segments that contain speech (e.g., as opposed to pauses). After performing the SAD, the audio segments can be analyzed further. Metrics that can be used to quantify the objectives and/or effectiveness of speaker diarization systems include precision and recall. Precision refers to a measure of the accuracy with which audio is associated with a particular speaker, i.e., the proportion of correctly labeled audio in relation to the audio labeled as the speaker. Precision takes into account false alarms (segments incorrectly identified as associated with a particular speaker). Recall, on the other hand, refers to a measure of speech identified with a particular speaker in relation to the total amount of speech from that speaker (i.e., how much of the speaker's speech was found), and therefore takes into account miss rate (how much speech from the speaker was missed). High precision can be desirable for some applications, such as speaker recognition, while high recall can be important for other applications (e.g., transcription of meetings).

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
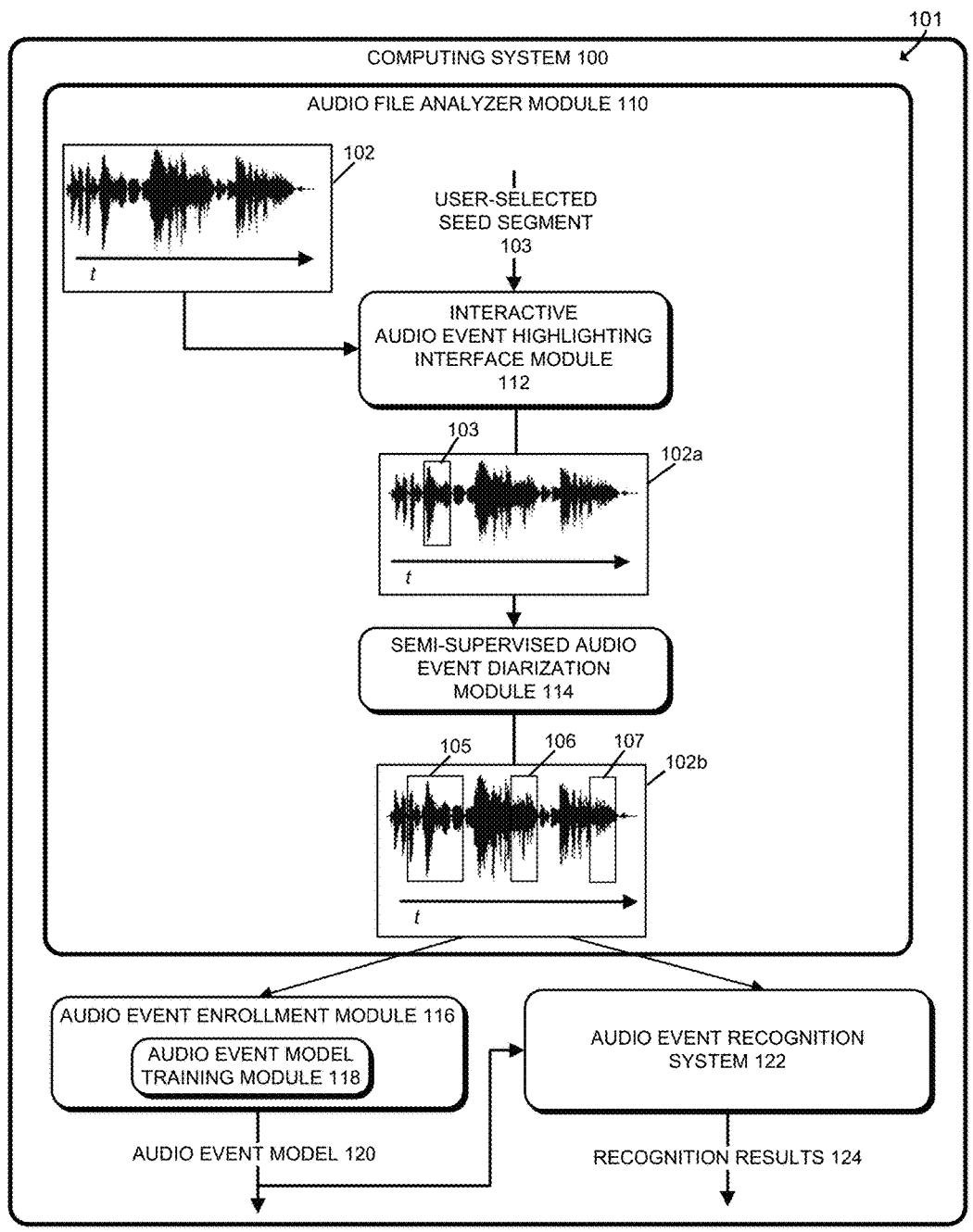
FIG. 1 is a simplified schematic diagram of an environment of at least one embodiment of a computing system for performing semi-supervised audio event diarization on digital audio files, as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The presence of multiple speakers in an audio file can significantly increase the error rate of conventional automated speaker diarization systems. Unsupervised automatic diarization systems estimate the number of speakers in a file, attempt to find segments for each speaker, and then present the found segments either to a human user for hand labeling of speaker names or to an automatic speaker identification system to label segments. This approach suffers from two issues: the challenge of accurately determining the total number of speakers contributing to the audio in the file, and the inability to provide high precision results. The low-precision results offered by unsupervised techniques generally are not sufficient for speaker identification tasks and may not be acceptable for other types of tasks, as well.

In contrast, the technologies disclosed herein can dramatically improve the localization of single speaker segments of a multi-speaker audio file, while using just a small amount of pre-selected audio from the file as a "ground truth" for the diarization. As used herein, "ground truth" may refer to a segment of an audio file that is accepted by the system as being representative of the desired audio event of interest, e.g., with 100% confidence or probability of 1.0, for purposes of comparison with other segments of the audio file.

Embodiments of the disclosed technology can achieve high precision with only a minimal amount of user interaction with the system. As used herein, "localization" may refer to the identification of a particular segment of an audio file as having been produced (e.g., spoken or sung by) a particular speaker. To perform localization, the disclosed technologies utilize a small, pre-selected segment of the audio file to be analyzed (e.g., in the range of about 5 to about 10 seconds in length) as a "seed segment" for the analysis of the remaining portions of the audio file. In other words, the seed segment establishes the ground truth for the subsequent analyses that are performed by the system.

As used herein, a "segment" or "chunk" may refer to a portion of an audio file that spans a duration of time that is less than the entire duration of the audio in the file. For example, a segment may comprise one or more "frames" or "time slices," e.g., a short, fixed-length portion of the audio file that can be used for acoustic analysis or other purposes. For instance, individual frames may be sampled in the range of about every 10 milliseconds using a sliding window in the range of about 20 to about 30 milliseconds. In some cases, a segment may include a continuous, uninterrupted sample of an audio event of interest (e.g., speech of a particular person). In other cases, a segment may be formed by combining (e.g., concatenating) multiple shorter uninterrupted audio event segments together (e.g., shorter speech segments of the person of interest spaced temporally throughout the audio file). In still other cases, a segment may be made up of speech of multiple different speakers and/or non-speech (e.g., periods of silence, background noise, or non-speech audio). Still further, in some cases, "segment" may refer to a set of acoustic features that represents a portion of the audio recorded in an audio file (e.g., feature vectors), rather than the raw recorded audio signal itself. As used herein, "audio file" may refer to any type of digital storage or transmission medium that contains audio, e.g. sound files, video files, multimedia files, and/or others, and may include live (e.g., streamed) audio and/or audio that has been previously recorded.

As used herein, "acoustic features" may refer to, among other things, discrete or continuous numerical values that each represent a characteristic of an audio signal (which may be recorded and stored in an electronic file). Acoustic features include numerical measurements of acoustic energy at different frequencies of the audio signal, which typically are calculated using a Fourier transform. Examples of acoustic features and algorithms that can produce acoustic features include the mel frequency cepstral coefficient (MFCC), filter banks, perceptual linear prediction (PLP), and neural networks, among others. In some applications, a frame of an audio file may be represented mathematically or in computer code as a vector of these and/or other acoustic features.

As used herein, the term "speaker" may be used to refer to human speakers, other living creatures (e.g., pets or other animals), or even to inanimate objects or systems, in some applications. For example, rather than detecting segments of a particular speaker's speech within the audio file, the technologies disclosed herein can be used to detect instances of other types of audio events, such as distinctive vehicle noises of interest (e.g., the "Harley Davidson" sound, the sound of a helicopter, etc.), different types of musical instruments, human-produced but non-speech audio (e.g., clapping, cheering, laughter, etc.), synthesized speech (e.g., speech output by a computerized virtual personal assistant) and/or others. Thus, while this disclosure may describe exemplary embodiments related to "speech" events and "speakers," it should be understood that the disclosed technologies are equally applicable to other types of audio events and/or audio producers.

Accordingly, the technology disclosed herein may be referred, in some cases, as being applicable to "multi-class" audio files, e.g., audio files having multiple different classes (e.g., types or categories) of audio sounds. As such, rather than seeking to identify audio of a particular speaker, embodiments of the disclosed technology may be directed to the localization of another class, category, or type of audio within the audio file. In some applications, it may be desirable to use the disclosed technologies to identify all instances of background noise in an audio file, all instances of speech by a non-foreground speaker, all instances of a certain animal noise, or another type of audio event of interest. The audio event of interest or selected "class" of audio can be specified at any level of granularity as may be desired for a particular application of the disclosed technologies. For example, depending on the selection of the seed segment, the class of audio of interest can be defined at a very high level, e.g., to localize speech segments in which a particular language is being spoken (e.g., English vs. French), irrespective of the identities of the individual speakers, or at a much more specific level, e.g., to localize speech segments in which a particular singer is singing in a recording involving multiple different singers (so as to localize a particular child's solo portions of a choir recital).

Referring now to FIG. 1, an audio file analyzer computing system 100 is configured with an embodiment of an audio file analyzer module 110. The audio file analyzer module 110 is shown in the context of an environment 101 that may be created during the operation of the computing system 100 (e.g., an online or offline, native or virtual, execution or "runtime" environment). The audio file analyzer module 110 and portions thereof are embodied as a number of software, firmware, and/or hardware computer-readable modules, components, and/or data structures, in accordance with the requirements of a particular design or implementation of the system 100. The illustrative computing system 100 also includes an audio event enrollment module 116 and an audio event recognition system 122, but these components may be optional in other embodiments. Each of the audio event enrollment module 116 and the audio event recognition system 122, and the respective portions thereof, are embodied as a number of software, firmware, and/or hardware computer-readable modules, components, and/or data structures, in accordance with the requirements of a particular design or implementation of the system 100. In some implementations, the audio file analyzer module 110 may be implemented as a subcomponent of the audio event enrollment module 116 or the audio event recognition system 122, or vice versa.

The illustrative audio file analyzer module 110 includes an interactive audio event highlighting interface module 112 and a semi-supervised audio event diarization module 114, each of which are embodied in software, firmware, hardware or a combination thereof. In operation, the interactive audio event highlighting interface module ("highlighting module") 112 accesses an input audio file 102 and receives one or more user selections of portions of the audio file 102, which the highlighting module 112 processes as needed to create a user-selected seed segment 103. For example, the highlighting module 112 may combine multiple user-selected portions of the audio file 102 using, e.g., concatenation, to create the user-selected seed segment 103, or the highlighting module 112 may use a single user-selected portion of the audio file as the seed segment 103.

In the illustrative embodiments, the total length or duration of the seed segment 103 is relatively short in comparison to the total length or duration of the audio file 102. For example, in some embodiments, the duration of the seed segment 103 is in the range of about ten (10) seconds. Thus, the amount of user interaction with the system 100 required to perform the subsequent diarization is likely to be minimal, e.g., slightly more than is required for fully automated diarization systems but significantly less than systems that require manual hand labeling of the audio segments. Use of a combination of multiple different temporally-spaced (e.g., non-overlapping) samples of the audio of interest can help increase the accuracy of the subsequent diarization. Selection of portion(s) of the audio file 102 that contain uninterrupted audio of interest (e.g., uninterrupted speech of the speaker of interest) can also help increase the effectiveness of the subsequent diarization.

Figure 2:
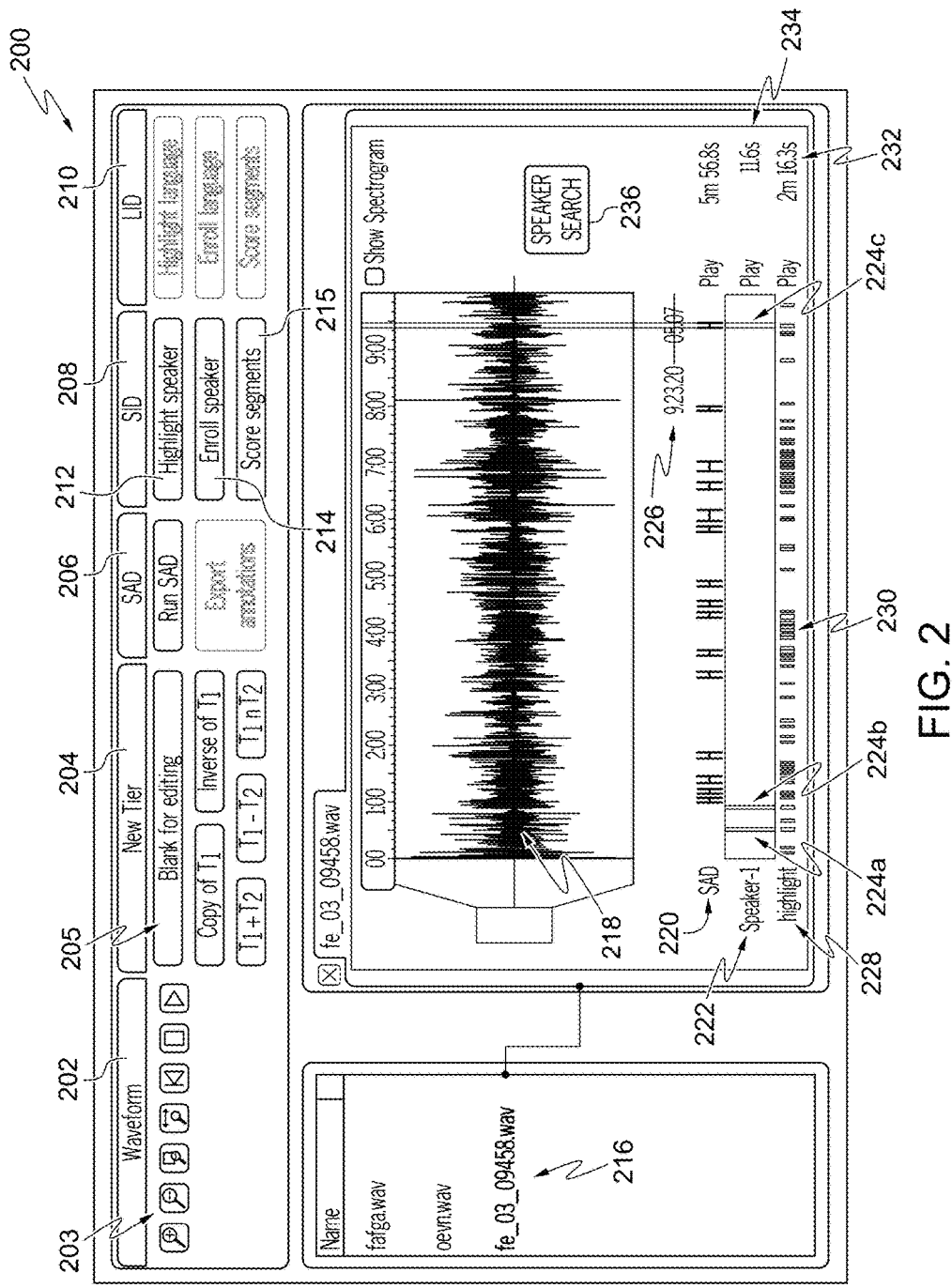
FIG. 2 is a simplified example of at least one embodiment of a graphical user interface that may be used by the interactive speaker highlighting interface module of FIG. 1 to obtain a user-selected seed segment.

In some embodiments, the highlighting module 112 displays a graphical representation of the audio file 102 on a graphical user interface and allows a human operator ("user") to identify the user-selected seed portion(s) of the audio file 102 interactively via the graphical user interface. An illustrative graphical user interface that can be used to interactively select portion(s) of audio as the seed segment 103 is shown in FIG. 2, described below. In other embodiments, unsupervised machine learning or other automated techniques may be used as a pre-processing step to identify the seed segment 103. In still other embodiments, unsupervised machine learning or other automated techniques may be used to pre-identify audio segments that are candidates for the seed segment 103, and then the highlighting module 112 may present the candidates to the user for interactive review and final selection of the seed segment 103. It should be understood that according to the illustrative embodiments, the user-selected seed segment 103 is obtained from the same audio file (e.g., audio file 102) on which diarization is subsequently performed.

The highlighting module 112 outputs, or otherwise makes available for use by other modules of the system 100, an audio file 102a. The illustrative audio file 102a includes the original contents of the input audio file 102 as well as annotation(s) that identify the portion(s) of the audio file 102 selected to be used as the seed segment 103. Such annotations may be embodied as, for example, labels, metatags or meta data. The annotations may be embodied as human-intelligible labels (e.g., natural language), alphanumeric identifiers, or computer-generated codes, for example.

Figure 3:
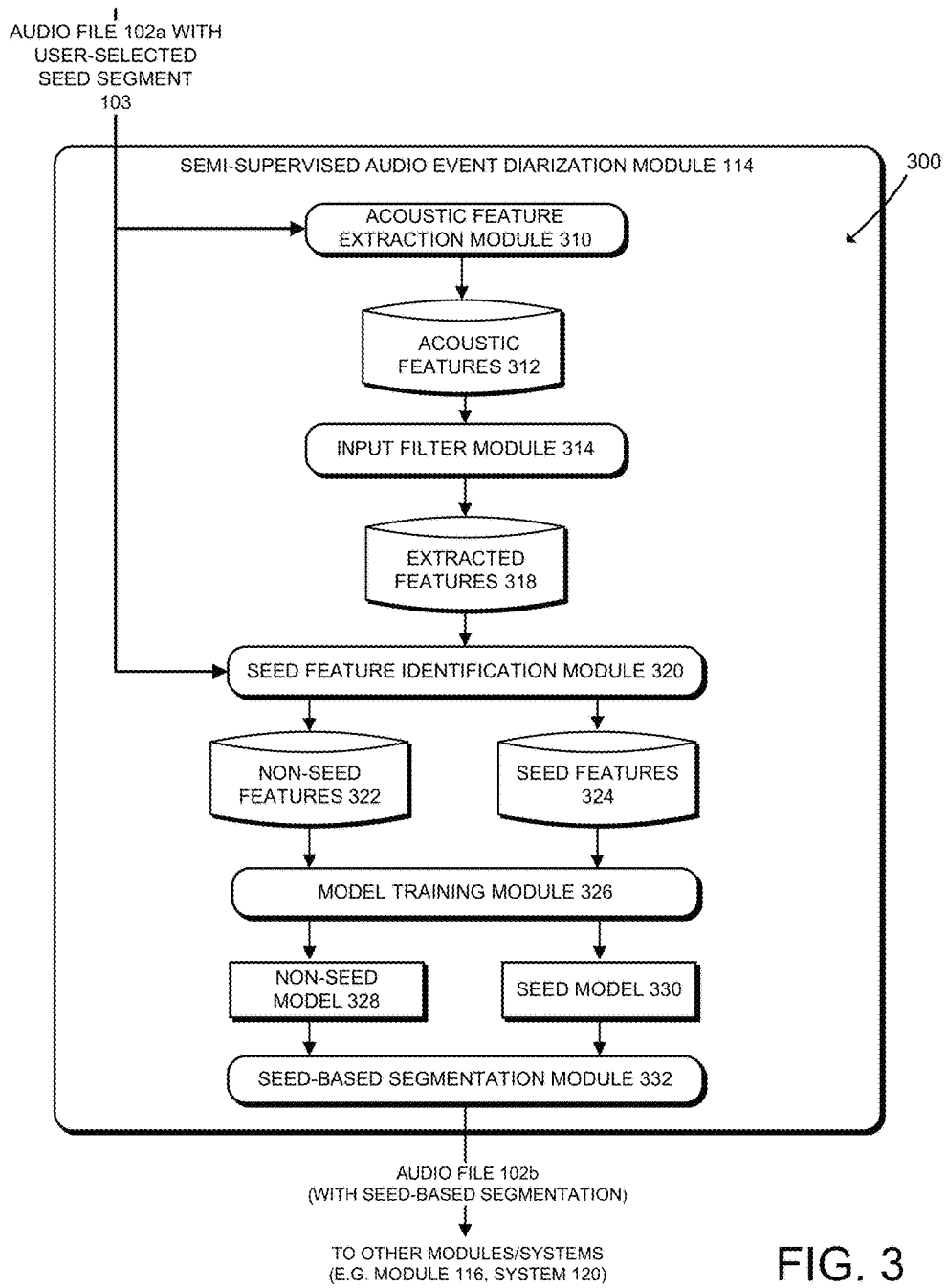
FIG. 3 is a simplified schematic diagram of an environment of at least one embodiment of the semi-supervised audio event diarization module of FIG. 1.
Figure 4:
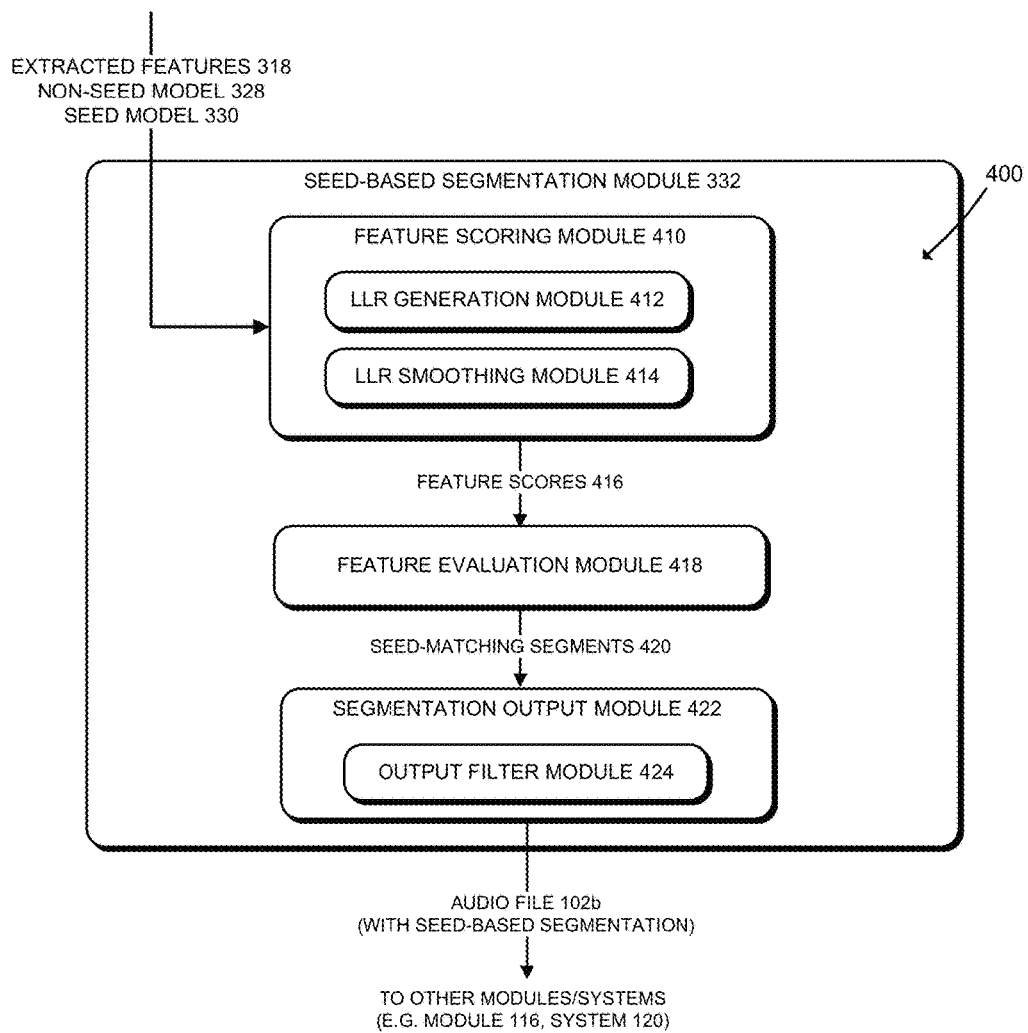
FIG. 4 is a simplified schematic diagram of an environment of at least one embodiment of the seed-based segmentation module of FIG. 3.
Figure 5:
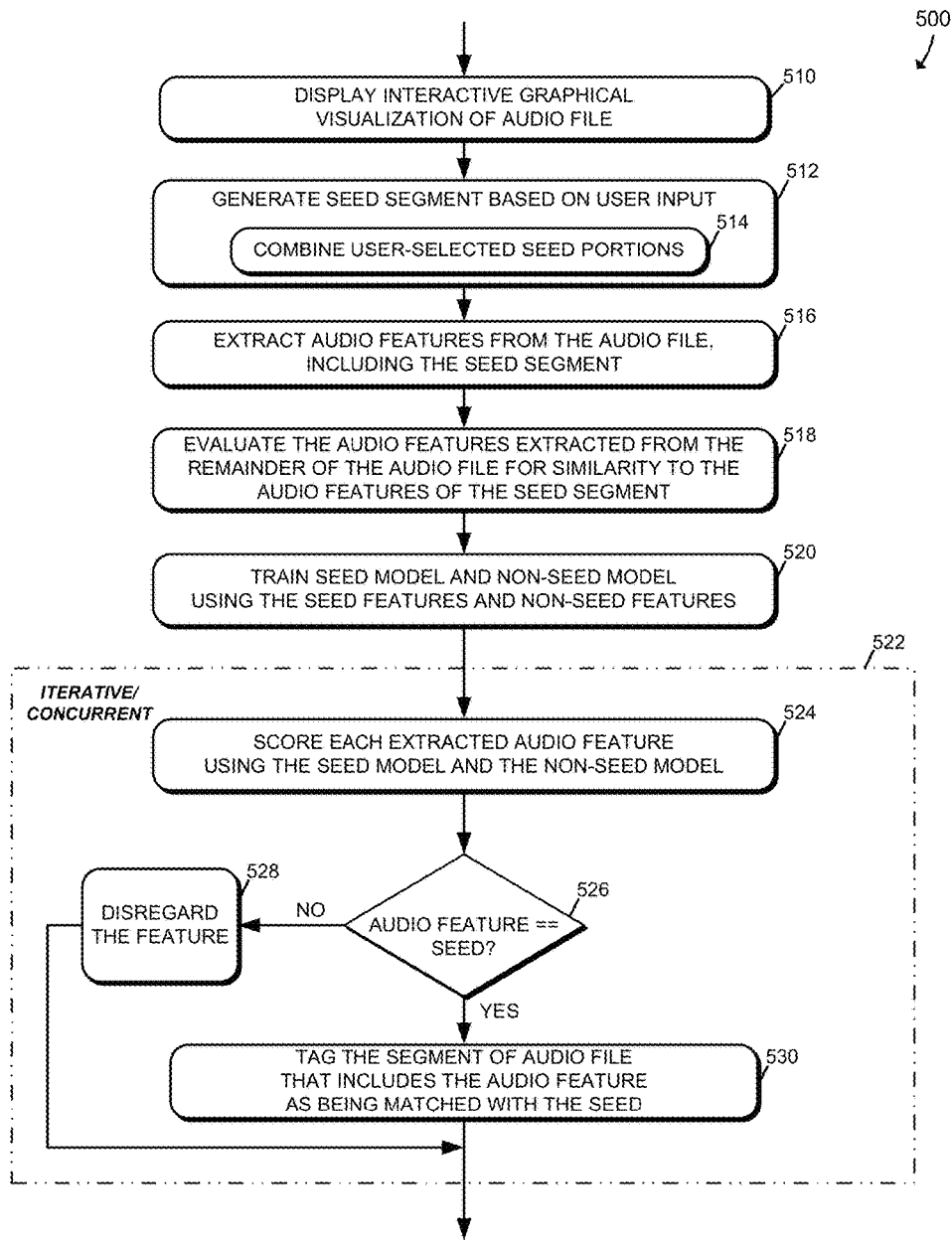
FIG. 5 is a simplified flow diagram of at least one embodiment of a method by which the computing system of FIG. 1 may perform semi-supervised audio event diarization.

The semi-supervised audio event diarization module ("diarization module") 114 uses the audio file 102a and the seed segment 103 as inputs to an automated diarization routine. Subcomponents of the illustrative diarization module 114 and details of the process by which the diarization module 114 performs audio event diarization are shown in FIGS. 3-5, described below. The diarization module 114 outputs, or otherwise makes available for use by other modules of the system 100, an audio file 102b. The illustrative audio file 102b includes the original audio content of the input audio file 102, the annotation(s) that identify the seed segment 103, and the annotation(s) identifying the other audio events 105, 106, 107 in the audio file 102, found by the diarization module 114. The audio events 105, 106, 107 found by the diarization module 114 match the acoustic characteristics of the seed segment 103 in terms of the relevant matching criteria. For example, if the seed segment 103 contains only speech produced by a particular person, the segments 105, 106, 107 identified by the diarization module 114 will also only contain speech produced by the same person who produced the speech contained in the seed segment 103 (but not necessarily the exact speech content that is contained in the seed segment).

As used herein, "match" or "correspond" may refer to a measure of similarity of acoustic characteristics of two different audio segments (e.g., similar energy levels), and generally is not intended to mean that the found segments must be an exact match to the seed segment 103, i.e., identical to the seed segment 103 in terms of the actual audio content (e.g., the same words spoken by the same speaker in both segments), although this may be appropriate in some applications. Rather, "match" or "correspond" as used herein is in most cases intended to convey simply that another segment found in the audio file 102 by the diarization module 114 and the seed segment 103 are highly likely to belong to the same pre-selected class of audio events (e.g., audio produced by the same speaker, or both segments being of the same type of sound), as evidenced by, for example, the strength of similarity of the acoustic characteristics of the segments.

In the illustration of FIG. 1, the segment 105 includes the seed segment 103 plus additional audio found by the diarization module 114 in adjacent frames of the audio file 102, which is also produced by the same speaker as the speaker of the seed segment 103. Similarly, the segments 106, 107 each contain additional speech found by the diarization module 114 to be produced by the speaker of the seed segment 103, but later in time (where the elapse of time is represented by "t" in the figures).

The audio file 102b and/or simply the annotations associated with the segments 105, 106, 107 may be used by many different applications, including by the audio event enrollment module 116 and/or the audio event recognition system 122. The illustrative audio event enrollment module ("enrollment module") 116 includes an audio event model training module ("training module") 118. The training module 118 is embodied as software, firmware, hardware or a combination thereof. The training module 118 uses the speaker-specific or event-specific segments identified by the diarization module 114 (e.g., segments 105, 106, 107) as training data to build an audio event model 120. The illustrative audio event model 120 is embodied in computer code, logic, and/or data structures as a mathematical model, e.g., a probabilistic model such as a Gaussian mixture model (GMM), which mathematically represents the acoustic characteristics of the audio event of interest of the seed segment 103. In some embodiments, the enrollment module 116 performs an automated enrollment procedure for enrolling a person in a speaker identification or speaker verification system. In other embodiments, the enrollment module 116 performs a similar "enrollment" procedure, except that rather than building a model that can be used to identify other audio samples as being spoken by a person of interest, the enrollment module 116 builds an audio event model 120 that can be used to identify other audio samples as matching another type of audio event of interest, based on the seed segment 103.

Figure 6:
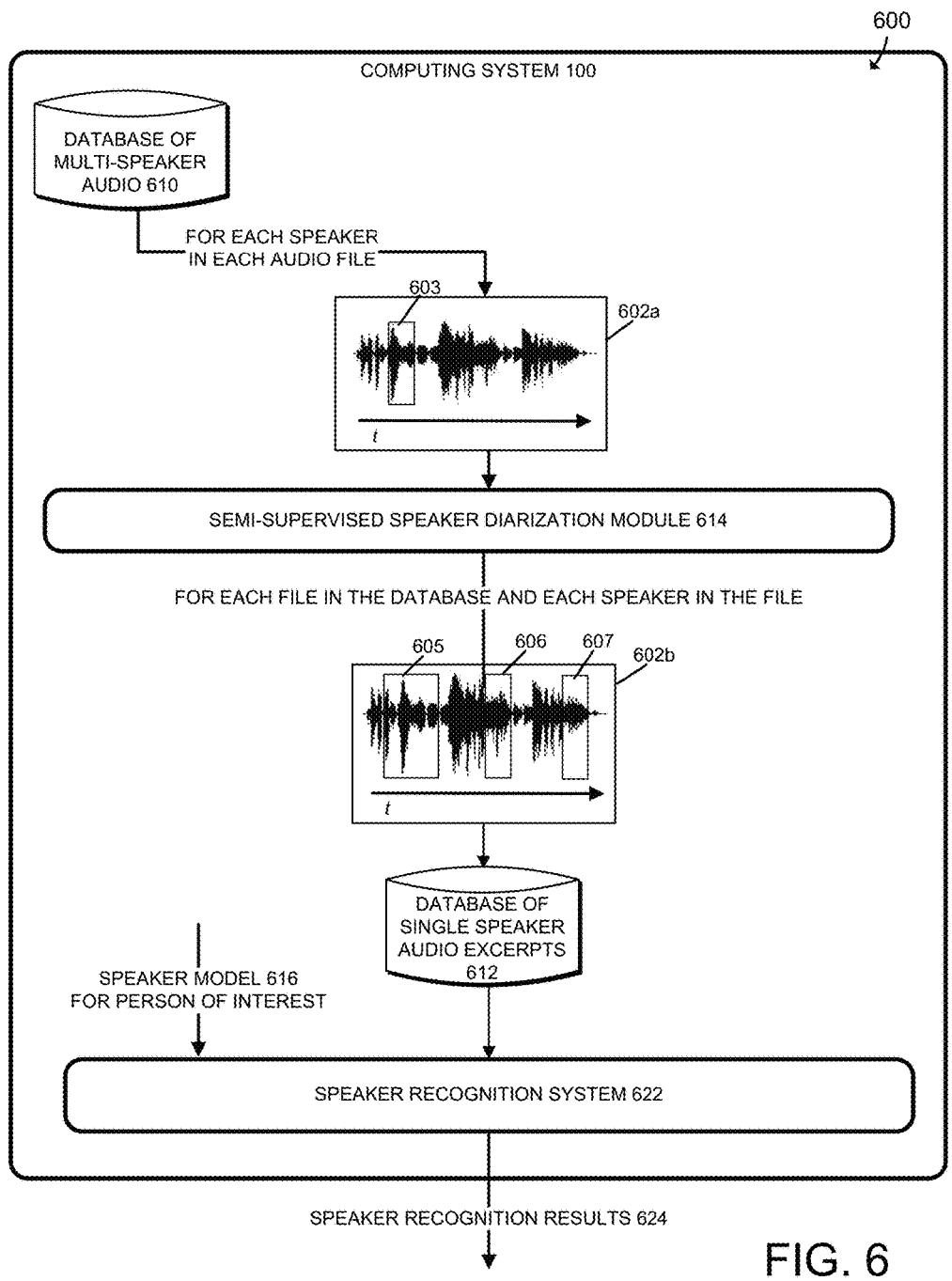
FIG. 6 is a simplified schematic diagram of an environment of at least one embodiment of components of the system of FIG. 1 in a use for audio event recognition.

The illustrative audio event recognition system ("recognition system") 122 can use the output of the audio file analyzer module 110 and an audio event model 120 produced by the enrollment module 116 to perform an automated event recognition procedure on other audio files. For example, the recognition system 122 can pre-process a large quantity of audio files in a database of audio files using the audio file analyzer module 110, to thereby extract out of the audio files segments that contain audio events of interest, in accordance with the seed segment 103. The recognition system 122 can then use an automated procedure to compare the extracted segments to the audio event model and identify audio files in the database that are likely to contain segments that correspond to the seed segment represented by the audio event model 120. The recognition system 122 can use, e.g., rules, templates, statistical or probabilistic algorithms (e.g., a Hidden Markov Model or HMM, neural networks, probabilistic linear discriminant analysis or PLDA, etc.), implemented in computer code, logic, and/or data structures, to determine the likelihood that any particular audio event extracted from the audio files in the database matches the characteristics modeled by the audio event model 120. The recognition system 122 can output the matching segments and/or information identifying the matching segments, as recognition results 124. The recognition system 122 may display the recognition results 124 in a ranked list, for example, according to the degree to which it is likely that the recognition results 124 match the characteristics modeled by the audio event model 120. An exemplary implementation of the audio event enrollment module 116 and audio event recognition system 122 for speaker recognition is shown in FIG. 6, described below.

Referring now to FIG. 2, an illustrative graphical user interface 200, which may be implemented as part of the interactive audio event highlighting module 112 (e.g., as a "front end" to the diarization module 114), is shown. The graphical user interface 200 includes a number of text elements, graphical elements, and interactive controls. The graphical user interface ("GUI") 200 is generated and displayed on a display screen of a computing device (e.g., a display screen of UI subsystem 724 of user computing device 710, shown in FIG. 7, described below). A number of graphical elements 202, 204, 206, 208, 210 indicate various functionality available to a user of the GUI 200. The GUI 200 displays a visualization 218, e.g., a graphical representation of an audio signal recorded in an audio file 216. While the illustrative GUI 200 shows the visualization 218 as an audio signal, the GUI 200 can, alternatively or in addition, display (play) videos in cases in which the electronic files to be analyzed include video files. For example, in some embodiments, the visualization 218 may display the video picture instead of or in addition to the graphical depiction of the audio signal, while the audio is output by speaker(s) of the computing system 100. Thus, in some embodiments, the GUI 200 or portions thereof can be implemented in or interface with a music or video player application (e.g., YOUTUBE, or any "plug-in"-type audio or video playing functionality, such as may be provided with an email application, an asynchronous messaging service, or a social media application).

Waveform functionality 202 includes a number of interactive tools 203 that permit the user to manipulate the view of the graphical representation 218 (e.g., zoom in, zoom out, fast-forward, rewind, etc.). Graphical elements 204 (new tier), 206 (speech activity detection), and 210 (language identification) relate to functionality that may be described more fully in one or more other related patent applications of the applicant. Graphical element 208 (speaker identification), relates to functionality that can be accessed by interactive, selectable graphical controls for speaker highlighting 212, speaker enrollment 214, and segment scoring 215.

In operation, a user interacts with the GUI 200 to select an electronic file to be analyzed. In the illustration of FIG. 2, the user has selected an audio file 216 from a list of available audio files. The GUI 200 displays the graphical representation 218, which illustrates the audio content of the selected file 216 (e.g., as an acoustic signal). The user may, using the SAD functionality 206, cause the system 100 to perform speech activity detection. The results of speech activity detection are displayed graphically at line 220, in which the "H"-like segments represent different instances of speech detected in the audio file 216 by the SAD functionality 206. At 234, the GUI 200 displays the total amount of speech detected by the SAD functionality 206 in the audio file 216 (e.g., 5 minutes, 56.8 seconds). To select a seed segment 103, the user simply marks, taps or selects portion(s) of the signal 218 that the user desires to include in the seed segment 103. This can be done at the same time as the user is playing (listening to) the audio file 216. For instance, as the user is listening to the recording, the user can mark the portions of the signal 218 that are of interest for diarization purposes. The portions of the signal 218 that have been selected by the user for inclusion in the seed segment 103 in this case are indicated at line 222 by the vertical bars 224a, 224b, and 224c. In the illustration of FIG. 2, the user is in the process of selecting the segment 224c, and so the GUI 200 highlights that segment and indicates the temporal duration of the selected segment (at 226), until the selection is completed. At 234, the GUI 200 displays an indication of the total time duration of the portions of the signal 218 that the user has selected for inclusion in the seed segment 103 (e.g., 11.6 seconds). As noted above, the system 100 is designed to perform highly precise diarization using a short-duration seed segment, so once the duration of the seed segment (which is made up of the segments 224a, 224b, 224c) falls within the desired range, the user can initiate the automated semi-supervised diarization. To start the diarization, the user activates (e.g., by tapping, selecting, clicking a mouse, etc.) the highlight speaker interactive control 212.

When the highlight speaker control 212 is activated, the system 100 performs the automated semi-supervised diarization and displays the output at line 228. The vertical bars 230 represent all of the other segments of the audio file 216 that the diarization module 114 has found as corresponding to the seed segment 103. For example, if the user-selected segments 224a, 224b, 224c all contain uninterrupted speech produced by the same speaker ("Speaker 1"), then the graphical bars of 230 identify other portions of the audio file 216 that, according to the diarization module 114, are likely to also contain speech produced by Speaker 1. In the illustrative GUI 200, the vertical bars and H-like graphics displayed in lines 220, 222, 228 are vertically aligned with the graphical representation 218 of the audio contained in the audio file 216; that is, the position of a vertical bar in its respective line 220, 222, 228 corresponds to the audio in the frame of the display 218 that is in vertical alignment with the bar. At 232, the GUI 200 displays the total time duration of all of Speaker 1 segments 230 (e.g., 2 minutes, 16.3 seconds).

The illustrative GUI 200 also includes an interactive "speaker search" button 236. When activated, the speaker search button 236 initiates a search for more audio that matches the seed segment 103, across multiple audio and/or video files. For instance, activation of the speaker search button 236 may launch the audio event enrollment module 116 and/or the audio event recognition system 122, or initiate the speaker search technology shown in FIG. 6, described below, to search a database, repository, or collection of electronic files containing audio. It should be understood that references herein to "button" or other types of interactive GUI controls may refer to any suitable type of interactive control mechanism, whether implemented as a touch-sensitive button, a hyperlink, a slider, a dial, a voice-activated control, etc.

In some embodiments in which the GUI 200 may be implemented as part of an audio/video search, retrieval, or player application, the system 100 analyzes an audio or video file and generates multiple candidate seed segments (using, e.g., a form of unsupervised machine learning). As the user is watching the video/listening to the audio, the "speaker search" button (or link) becomes active when the user is listening to a part of the audio that the system 100 has identified as a candidate seed. The candidate seed corresponding to the audio being listened to is highlighted (e.g., by changing its display color). If the candidate seed is selected (e.g., by the user clicking/tapping on the speaker search button/link, the disclosed semi-supervised diarization technology is performed, the speaker of the candidate seed is enrolled (e.g., by the audio event enrollment module 116), and speaker recognition is performed on one or more other videos on which automated segmentation has been performed with the same or similar auto-seed and segmentation technology (e.g., by the audio even recognition system 122). The system 100 (e.g., the GUI 200) then displays the search results, e.g., as a list of relevant videos that contain segments produced by the speaker of the selected candidate seed. Clicking/tapping on a search result in the list takes the user directly to the portion of the audio file in which the speaker of interest is speaking. While discussed in terms of speaker search, it should be understood that the same technology can be used to auto-generate candidate seeds, select a seed, and use the selected seed to search, and retrieve non-speech audio events, such as to search for audience applause in videos based on finding a single example of the applause and selecting the found example as a seed.

The found segments can be extracted, combined as needed, and used for various applications, including automated generation of a "highlight reel" including just Speaker 1's audio, creation of a speaker model, speaker identification, speaker verification, search and retrieval of other audio files, etc. It should be noted that the system 100 generally is not particularly concerned with the personal identity of the audio producer, e.g., "Speaker 1," but merely with identifying all of the segments produced by that speaker (whoever that speaker is). Of course, additional speaker-identifying information may be provided, e.g., by the user or by a database lookup, in some embodiments.

Referring now to FIG. 3, an embodiment of the diarization module 114 is shown in the context of an environment 300 that may be created during the operation of the computing system 100 (e.g., an online or offline, native or virtual, execution or "runtime" environment). The diarization module 114 and its components and submodules are embodied as a number of software, firmware, and/or hardware computer-readable modules, components, and/or data structures, in accordance with the requirements of a particular design or implementation of the system 100.

In the embodiment of FIG. 3, the audio file 102a, including the user-selected seed segment 103, is processed by an acoustic feature extraction module 310, which extracts acoustic features 312 from the audio file 102a, including acoustic features of the seed segment 103 and acoustic features of the remaining audio of the audio file 102a not included in the seed segment 103. The acoustic features 312 include, for example, MFCCs and/or PLPs.

An input filter module 314 is embodied as a "coarse" filter that separates out, from the acoustic features 312 extracted by the acoustic feature extraction module 310, features that have a very low probability of being similar to features that are representative of class of audio associated with the seed segment 103. The input filter module 314 may be embodied as a universal background model (UBM), for example. In speaker diarization embodiments, the input filter module 314 may be configured to filter out pauses and noise that is clearly not speech (i.e., features that have a low probability of being representative of speech). On the other hand, if the diarization is being used to localize non-speech audio events of interest, the input filter module 314 may be used to exclude features that are clearly representative of speech and have a low probability of being representative of non-speech audio. Thus, the selection of an appropriate input filter module 314 can be static, i.e., pre-determined, or can be made dynamically by the system 100 based on a class or characteristics of the user-selected seed segment 103. In still other embodiments, the input filter module 314 may be omitted entirely.

If an input filter is used, the extracted features 318 are the features that remain after the input filter module 314 has been applied to the acoustic features 312. If no input filter is used, the extracted features 318 are simply the same as the acoustic features 312. In speaker diarization embodiments, the extracted features 318 may be referred to as the "speech features" because the input filter module 314 will have filtered out the clearly non-speech features.

The extracted features 318 are output by either the acoustic feature extraction module 310 or the input filter module 314, as the case may be, and made available for use by other modules of the system 100, including a seed feature identification module 320. The illustrative seed feature identification module 320 compares the features extracted from the seed segment 103 to the features extracted from the remaining, non-seed portions of the input audio file 102, and separates the features that are representative of the seed segment 103 (seed features 324) from the features that are representative of characteristics of other portions of the audio file 102 that are not included in the seed segment 103 (non-seed features 322). The seed feature identification module 320 outputs or otherwise makes available for use by other modules of the system 100, including a model training module 326, the non-seed features 322 and the seed features 324. The extracted features 318, the non-seed features 322, and the seed features 324 may be stored in one or more searchable databases, digital files, tables, lists, other suitable data structures, or a combination thereof.

The model training module 326 trains a non-seed model 328 using the non-seed features 322 (and not the seed features 324) as training data, and also separately trains a seed model 330 using the seed features 324 (and not the non-seed features 322) as training data. As used herein, "train" may refer to the process of causing a computerized mathematical model to recognize associations between features and categories or classes of features. For example, training the non-seed model 328 involves causing the model 328 to associate the non-seed features 322 with the category of "non-seed" (and not with "seed"). Similarly, training the seed model 326 involves causing the model 330 to associate the seed features 322 with the category of "seed" (and not with "non-seed"). Thus, when a new audio feature is encountered (e.g., a feature that has not been previously encountered by the system 100), the system 100 can use the non-seed model 328 and the seed model 330 to determine whether the new audio feature appears to be more similar to the non-seed features 322 or more similar to the seed features 324. The non-seed model 328 and the seed model 330 each may be embodied in computer code, logic, and/or data structures as, for example, a discriminative model such as a Gaussian mixture model (GMM). The model training module 326 outputs or otherwise makes available to other modules of the system 100, including the seed-based segmentation module 332, the non-seed model 328 and the seed model 330.

The illustrative seed-based segmentation module 332 evaluates all of the extracted features 318 of the audio file 102 against both the non-seed model 328 and the seed model 330. That is, the same set of features 318 is separately input to both the non-seed model 328 and the seed model 330. Each of the features 318 is run through the non-seed model 328, and as a result, the seed-based segmentation module 332 generates an assessment of the likelihood that the feature 318 has the same acoustic characteristics as the non-seed features 322 as represented by the non-seed model 328. Similarly, each of the features 318 is run through the seed model 330, and the seed-based segmentation module 332 generates an assessment of the likelihood that the feature 318 has the same acoustic characteristics as the seed features 324. Additional details of the seed-based segmentation module 332 are shown in FIG. 4, described below.

The seed-based segmentation module 332 outputs or otherwise makes available to other modules of the system 100, the audio file 102b, including the results of the seed-based segmentation, which identify other segments of the audio file 102 that match or correspond to the seed segment 103. As noted above, "match" or "correspond" as used herein is in most cases intended to convey that another segment found in the audio file 102 and the seed segment 103 are highly likely to belong to the same user-selected class of audio events (e.g., spoken by the same speaker, or both being of the same type of sound), as evidenced by the extracted (acoustic) features 318, and not that the two segments are identical in terms of the exact audio content.

Referring now to FIG. 4, an embodiment of the seed-based segmentation module 332 is shown in the context of an environment 400 that may be created during the operation of the computing system 100 (e.g., an online or offline, native or virtual, execution or "runtime" environment). The seed-based segmentation module 332 and its components and submodules are embodied as a number of software and/or hardware computer-readable modules, components, and/or data structures, in accordance with the requirements of a particular design or implementation of the system 100.

In the illustrative seed-based segmentation module 332, a feature scoring module 410 applies each of the non-seed model 328 and the seed model 330 to each of the extracted features 318, as mentioned above, and assigns seed and non-seed scores to each of the features 318 based on the respective outputs of the models 328, 330. For instance, the seed score may be computed as a probability that the feature 318 is a seed feature and the non-seed score may be computed as a probability that the feature 318 is a non-seed feature. In some embodiments, the seed and non-seed scores may be signed, e.g., a positive score (greater than zero) may indicate that the feature 318 is highly likely to be a seed feature, whereas a negative score (less than zero) may indicate that the feature 318 is highly likely to be a non-seed feature. Thus, seed and non-seed scores that are close to zero on either the positive or negative side may indicate greater uncertainty as to whether the feature 318 is a seed feature or a non-seed feature.

The illustrative feature scoring module 410 utilizes an LLR generation module 412, to generate the seed and non-seed scores using a measure of model log likelihood ratio (LLR). The illustrative LLR generation module 412 generates an LLR value for each feature 318, which is computed as a ratio of the seed score to the non-seed score in the log domain. In some embodiments, an LLR smoothing module 414 may be used to ignore relatively insignificant fluctuations in the LLR values. The LLR smoothing module 414 may employ, for example, a median filtering algorithm. In other embodiments, the likelihood ratio (LR) may be used (as opposed to the log likelihood ratio). The likelihood ratio is the ratio of the seed score to the non-seed score.

The feature scoring module 410 outputs or otherwise makes available to other modules of the system 100, including a feature evaluation module 418, feature scores 416 (e.g., a seed LLR and a non-seed LLR). The feature evaluation module 418 compares the seed LLR of each feature 318 to a seed LLR offset value in order to decide whether to consider the feature 318 as a seed feature. The seed LLR offset value can be selected based on the requirements or design of a particular implementation of the system 100. For example, the seed offset value may be set higher if better recall is desired or lower if better precision is desired. The seed LLR offset value can be pre-defined (e.g., programmatically) or selected by the user via, e.g., the GUI 200. For example, the GUI 200 may include an interactive slider bar that allows the user to interactively and iteratively adjust the seed LLR offset value and observe the results until the desired results have been obtained. The seed LLR offset value may also be selected based on one or more characteristics of the seed segment 103.

Based on the comparison of the offset seed LLR (e.g., the seed LLR+/− the seed LLR offset value) to the non-seed LLR, the feature evaluation module 418 identifies seed-matching segments 420. The seed matching segments 420 are those other segments of the audio file 102 that the diarization module 114 concludes match or correspond (e.g., in terms of acoustic characteristics) to the seed segment 103. The feature evaluation module 418 outputs or otherwise makes available to other modules of the system 100, including the segmentation output module 422, the seed-matching segments 420 (or data indicative of the seed-matching segments 420, such as, for each segment, a binary yes/no or 0/1 decision value for each frame of the audio file 102).

The illustrative segmentation output module 422 outputs the final seed-based segmentation of the audio file 102, e.g., the audio file 102b and/or the particular segments 105, 106, 107 and the corresponding labels (e.g., "Speaker 1") for use by other modules, applications, and/or systems (such as enrollment module 116 or recognition system 122). The segmentation output module 422 may include an output filter module 424, which can be used to remove very short duration segments from the output (as such short detections may be false alarms or simply of minimal usefulness). The output filter module 424 may be employed in embodiments in which high precision is desired. Alternatively, the output filter module 424 may be omitted in embodiments in which high recall is desired.

Referring now to FIG. 5, an illustrative method 500 by which the computing system 100 may perform semi-supervised diarization is shown. The method 500 may be embodied in software, firmware, and/or hardware as computerized programs, routines, logic and/or instructions executed by the computing system 100, for example by the audio file analyzer module 110. In block 510, the system 100 displays an interactive graphical visualization of an audio file (e.g., graphical representation 218 of audio file 216). In block 512, the system 100 generates a user-selected seed segment (e.g., seed segment 103) of the audio file visualized in block 510. To do this, the system 100 may receive user selections via a graphical user interface (e.g., GUI 200). If the system 100 receives multiple user selections, the system 100 combines the multiple user selections to create the seed segment, in block 514. To do this, the system 100 may utilize, e.g., a concatenation function.

In block 516, the system 100 processes the audio file visualized in block 510, including the seed segment, and algorithmically extracts audio features from the audio file. The extracted audio features may include acoustic features, such as MFCCs. In embodiments in which the seed segment contains non-speech audio, other types of features may be used. In block 518, the system 100 evaluates the audio features extracted in block 516, and compares the features extracted from the seed segment to the features extracted from the remainder of the audio file, based on similarity of acoustic characteristics. Based on this comparison, the system categorizes each of the extracted audio features as either seed features or non-seed features.

In block 520, the system 100 trains a seed model using the audio features identified as seed features in block 518, and trains a non-seed model using the audio features identified as non-seed features in block 518. In loop 522, the system 100 iteratively and/or concurrently scores and labels each of the audio features extracted from the audio file in block 516 to indicate, for each of the extracted features, whether the feature likely matches (e.g., in terms of acoustic characteristics) the seed segment generated in block 512. In block 524, the system 100 scores each extracted feature using the seed model and the non-seed model developed in block 520 (using, e.g., the LLR described above). In block 526, the system 100 evaluates the audio feature scored in block 524 to determine whether the audio feature likely matches (e.g., in terms of acoustic characteristics) the seed segment. If the system 100 determines in block 526 that the audio feature does not likely match the seed segment, the system 100 disregards the feature in block 528 (or labels the audio segment containing the feature as "non-seed"). If the system 100 determines in block 526 that the feature does likely match the seed segment, the system 100 proceeds to block 530. In block 530, the system 100 tags or labels the audio segment containing the feature to indicate that the audio segment has been matched with the seed segment. Following either block 528 or block 530, the system 100 may evaluate another feature, return, or conclude the segmentation.

Example Usage Scenarios

The disclosed technologies have a number of different uses and applications, including, but not limited to those mentioned in this disclosure. In one example, people and groups who are concerned with speaker identification and verification tasks, for biometric authentication or other reasons, such as universities, military groups, law enforcement, and commercial businesses, may use the technology. In another example, the technology may be used to perform a rapid triage of a large number of multi-speaker audio files. Information extracted from the audio files by the disclosed technologies can be used in many different types of voice comparison applications, including search, indexing and retrieval of databases of audio files, video files, or multimedia files containing audio, and building speaker models for speaker identification or speaker verification.

Referring now to FIG. 6, an application of the audio file analyzer module 110 for use in speaker recognition is shown in the context of an environment 600 that may be created during the operation of the computing system 100 (e.g., an online or offline, native or virtual, execution or "runtime" environment). The components shown in FIG. 6 are embodied as a number of software, firmware, and/or hardware computer-readable modules, components, and/or data structures, in accordance with the requirements of a particular design or implementation of the system 100. In the environment 600, the computing system 100 accesses a database 610, which contains a number of multi-speaker audio files. Using, e.g., the interactive audio event highlighting interface module 112 or the GUI 200, the computing system 100 processes each audio file in the database 610 to generate a seed segment for each speaker in the audio file. for example, in an audio file 602a containing speech of multiple different speakers, the system 100 selects a seed segment 603 for each of the speakers.

A semi-supervised speaker diarization module 614 performs semi-supervised speaker diarization on each of the audio files (e.g., file 602a) in the database 610, using the respective seed segments (e.g., seed segment 603) and the technology described above with reference to the diarization module 114. The semi-supervised speaker diarization module 614 outputs or otherwise makes available to other modules, applications, or systems, a grouping or cluster of segments (e.g., segments 605, 606, 607) matching each seed segment (e.g., seed segment 603) of each file (e.g., file 602a) of the database 610. The system 100 stores the seed-matched clusters of segments (e.g., segments 605, 606, 607), along with a reference to the audio file from which the segments were extracted, in a database of single-speaker audio excerpts 612.

Perhaps independently or separately of the above processes, the computing system 100 also generates a speaker model 616, analogous to the audio event model 120, for a person of interest, using training data obtained using the above-described seed-based segmentation techniques or other techniques. The speaker model 616 is used by a speaker recognition system 622 to search the database 612 for audio segments that match the speaker model 614. The speaker recognition system 622 is analogous to the audio event recognition 122 but specifically configured for speaker recognition. The speaker recognition system 622 outputs or otherwise makes available to other modules, applications, or systems, speaker recognition results 624. The speaker recognition results 624 may include, for example, a listing of audio file names that likely contain audio matching the speaker model 614 and/or a set of the matching audio segments.

Implementation Examples

Figure 7:
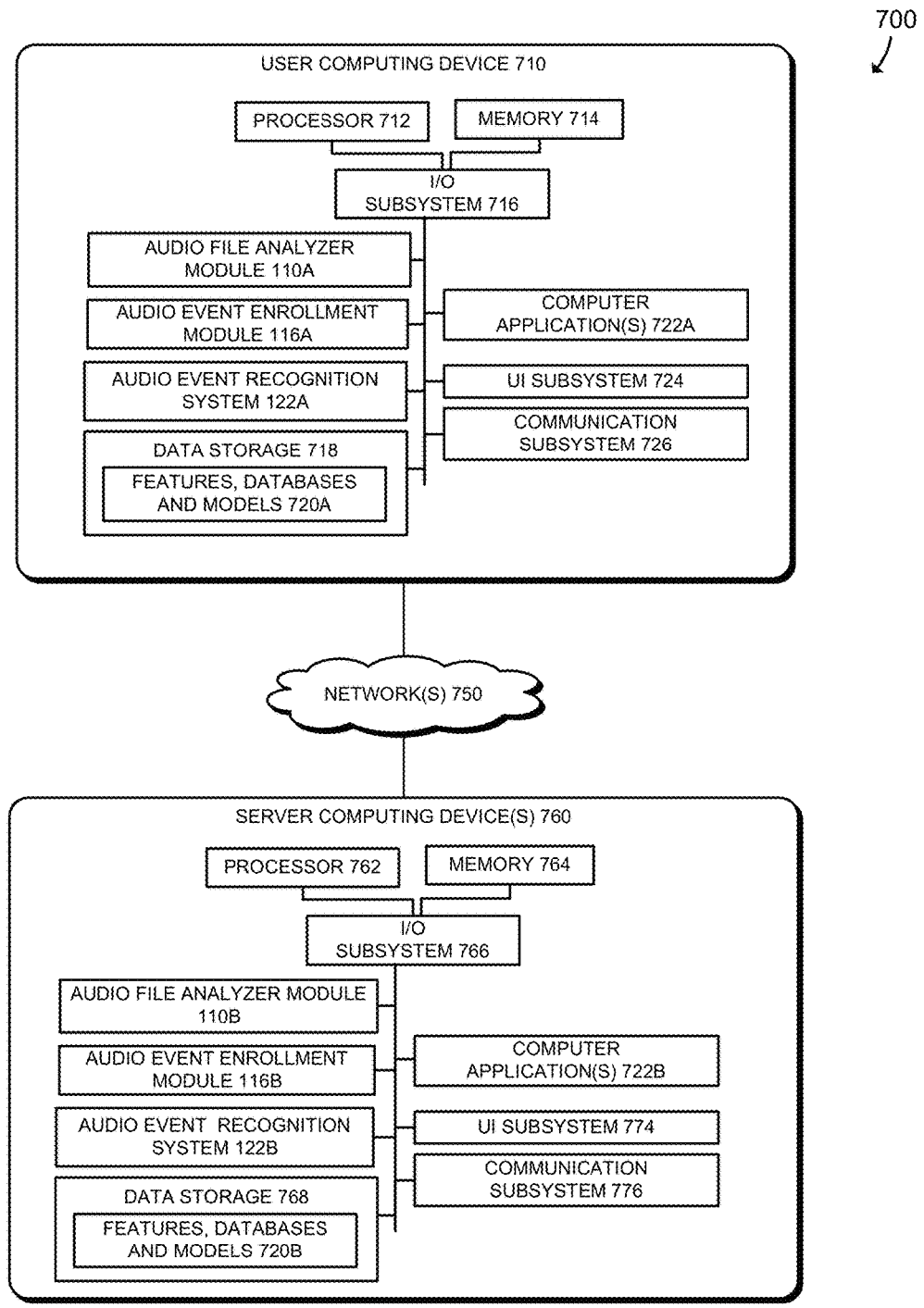
FIG. 7 is a simplified schematic block diagram of an exemplary computing environment in connection with which at least one embodiment of the computing system of FIG. 1 may be implemented.

Referring now to FIG. 7, a simplified block diagram of an embodiment 700 of the computing system 100 is shown. While the illustrative computing system 700 is shown as involving multiple computing devices, it should be understood that in some embodiments, the computing system 700 may constitute a single computing device, alone or in combination with other devices. The computing system 700 includes a user computing device 710, which may be in communication with one or more server computing devices 760 via one or more networks 750. The audio file analyzer module 110, audio event enrollment module 116, and/or audio event recognition system 122, or portions thereof, may be distributed across multiple computing devices 710, 760 that are connected to the network(s) 750 as shown. In other embodiments, however, the audio file analyzer module 110 may be located entirely on the computing device 710. In some embodiments, portions of the system 100 may be incorporated into other computer applications. As used herein, "computer application" may refer to hardware, software, a combination of hardware and software, or any level of software application (e.g., operating system, middleware, libraries, frameworks, and/or interactive user-level applications). For example, portions of the system 100 may be incorporated into or accessed by online audio player applications, audio recording applications, audio file organization, search, or retrieval systems, intelligent assistance applications, and/or others.

The illustrative computing device 710 includes at least one processor 712 (e.g. a microprocessor, microcontroller, digital signal processor, etc.), memory 714, and an input/output (I/O) subsystem 716. The computing device 710 may be embodied as any type of computing device capable of performing the functions described herein, such as a personal computer (e.g., desktop, laptop, tablet, smart phone, wearable device, body-mounted device, etc.), a server, an enterprise computer system, a network of computers, a combination of computers and other electronic devices, or other electronic devices. Although not specifically shown, it should be understood that the I/O subsystem 716 typically includes, among other things, an I/O controller, a memory controller, and one or more I/O ports. The processor 712 and the I/O subsystem 716 are communicatively coupled to the memory 714. The memory 714 may be embodied as any type of suitable computer memory device (e.g., volatile memory such as various forms of random access memory).

The I/O subsystem 716 is communicatively coupled to a number of hardware and software components and/or other computing systems including "front end" portions of the computer application(s) 722A (which may include any other applications residing on or accessible to the computing device 710), a "front end" of the audio file analyzer module 110A, a "front end" of the audio event enrollment module 116A, and/or a "front end" of the audio event recognition system 122A, a user interface subsystem 724, which includes one or more user input devices (e.g., one or more microphones, touchscreens, keyboards, virtual keypads, etc.) and one or more output devices (e.g., speakers, displays, LEDs, haptic devices, etc.). The I/O subsystem 716 is also communicatively coupled to one or more data storage media 718, and a communication subsystem 726. It should be understood that each of the foregoing components and/or systems may be integrated with the computing device 710 or may be a separate component or system that is in communication with the I/O subsystem 716 (e.g., over a network 750 or a serial bus connection).

The data storage media 718 may include one or more hard drives or other suitable data storage devices (e.g., flash memory, memory cards, memory sticks, and/or others). In some embodiments, portions of other computer application(s) 722A, the audio file analyzer module 110A, the audio event enrollment module 116A, the audio event recognition system 122A, features, databases and models 720A (e.g., models 120, 328, 330, features 312, 318, 322, 324, databases 610, 612), and/or other data reside at least temporarily in the data storage media 718. Portions of the other computer application(s) 722A, the audio file analyzer module 110A, the audio event enrollment module 116A, the audio event recognition system 122A, features, databases and models 720A (e.g., models 120, 328, 330, features 312, 318, 322, 324, databases 610, 612), and/or other data may be copied to the memory 714 during operation of the computing device 710, for faster processing or other reasons.

The communication subsystem 726 may communicatively couple the computing device 710 to one or more communication networks 750, e.g., a local area network, wide area network, personal cloud, enterprise cloud, public cloud, and/or the Internet, for example. Accordingly, the communication subsystem 726 may include one or more wired or wireless network interface software, firmware, or hardware, for example, as may be needed pursuant to the specifications and/or design of the particular computing system 100.

The server computing device(s) 760 may be embodied as any suitable type of computing device capable of performing the functions described herein, such as any of the aforementioned types of devices or other electronic devices. For example, in some embodiments, the server computing device(s) 760 may include one or more server computers including data storage media 768, which may be used to store "back end" portions of other computer application(s) 722B, the audio file analyzer module 110B, the audio event enrollment module 116B, the audio event recognition system 122B, features, databases and models 720B (e.g., models 120, 328, 330, features 312, 318, 322, 324, databases 610, 612), and/or other data. The illustrative server computing device 760 includes one or more processors 762, memory 764, an I/O subsystem 766, data storage media 768, a user interface subsystem 774, and a communication subsystem 776, each of which may be embodied similarly to the corresponding components 712, 714, 716, 718, 724, 726, respectively, described above. The computing system 700 may include other components, sub-components, and devices not illustrated in FIG. 7 for clarity of the description. In general, the components of the computing system 700 are communicatively coupled as shown in FIG. 7 by signal paths, which may be embodied as any type of wired or wireless signal paths capable of facilitating communication between the respective devices and components.

Additional Examples

Illustrative examples of the technologies disclosed herein are provided below. An embodiment of the technologies may include any one or more, and any combination of, the examples described below.

In an example 1, an audio file analyzer module includes instructions embodied in one or more non-transitory machine accessible storage media. The audio file analyzer module is configured to cause a computing system comprising one or more computing devices to: receive a user selection indicative of a seed segment of an electronic file, the electronic file comprising audio content produced by a plurality of different living-being speakers, the seed segment comprising an audio event produced by one of the plurality of different speakers; and using the seed segment, algorithmically: (i) analyze a remaining portion of the audio content of the electronic file, and (ii) identify, in the remaining portion of the audio content of the electronic file, other audio events likely produced by the speaker of the seed segment.

An example 2 includes the subject matter of example 1, and is configured to cause the computing system to, by a graphical user interface of the computing system, display a graphical representation of the audio content of the electronic file; and receive the user selection indicative of the seed segment by an interaction with the graphical user interface. An example 3 includes the subject matter of example 1 or example 2, and is configured to cause the computing system to receive a plurality of user selections, wherein each user selection comprises a different portion of the audio content of the electronic file and all of the user selections comprise audio content produced by the same speaker, and the audio file analyzer module is configured to combine the plurality of user selections to create the seed segment. An example 4 includes the subject matter of any of examples 1-3, and is configured to cause the computing system to, algorithmically: extract a plurality of speech features from the audio content; using the seed segment, categorize the speech features into seed features and non-seed features according to a level of similarity of the speech features to features of the seed segment; train a non-seed model using the non-seed features, train a seed model using the seed features; apply both the non-seed model and the seed model to all of the speech features extracted from the audio content; score each of the speech features according to a likelihood that the speech feature matches one or more of the seed features; and, based on the speech feature scores, locate, in the electronic file, one or more similar audio events produced by the speaker of the seed segment. An example 5 includes the subject matter of example 4, and is configured to cause the computing system to, algorithmically, extract a plurality of acoustic features from the audio content of the electronic file, select a filter based on a type or characteristic of the seed segment, and apply the selected filter to the acoustic features to obtain the speech features. An example 6 includes the subject matter of example 5, and is configured to cause the computing system to apply an offset to the score of each feature, wherein the offset is dynamically adjustable to increase or decrease a degree of accuracy with which the other speech segments are identified as produced by the speaker of the seed segment and/or to increase or decrease a number of the other speech segments that are identified as being produced by the speaker of the seed segment.

In an example 7, a method for identifying audio events of interest in an audio file that includes multiple different types of audio events is performed by a computing system comprising one or more computing devices, and includes: receiving a user selection indicative of an audio event of interest in the audio file; creating a model of the audio event of interest; and using the model of the audio event of interest, algorithmically (i) analyzing a remaining portion of the audio file, and (ii) locating, in the remaining portion of the audio file, one or more other audio events likely of the same type as the audio event of interest.

An example 8 includes the subject matter of example 7, and includes developing an audio event model using the model of the audio event of interest and the other audio events algorithmically identified as being likely of the same type as the audio event of interest. An example 9 includes the subject matter of example 7 or example 8, and includes using an audio event model developed with the audio event of interest and the audio events algorithmically identified as being likely of the same type as the audio event of interest to perform automated audio event recognition in one or more other audio files. An example 10 includes the subject matter of any of examples 7-9, and includes developing an audio event model using the audio event of interest and the other audio events algorithmically identified as being likely of the same type as the audio event of interest, using the audio event model to search a database of audio files for audio events of the same type as the audio event of interest, and outputting a list of audio files arranged according to a likelihood that the audio files comprise an audio event of the same type as the audio event of interest. An example includes the subject matter of any of examples 7-10, wherein the audio event of interest comprises one or more of: speech, human-generated non-speech audio, and other non-speech audio.

In an example 12, a system for analyzing multi-speaker audio files includes: an interactive speaker highlighting interface module to receive a user selection indicative of a seed segment of a multi-speaker audio file, the seed segment comprising a speech event produced by a single speaker; and a semi-supervised speaker diarization module to, using the seed segment, algorithmically (i) analyze a remaining portion of the multi-speaker audio file, and (ii) identify, in the remaining portion of the multi-speaker audio file, one or more other speech segments likely produced by the speaker of the seed segment.

An example 13 includes the subject matter of example 12, and includes a speaker enrollment module to develop a speaker model based on the seed segment and the algorithmically-identified other speech segments produced by the speaker of the seed segment. An example 14 includes the subject matter of example 13, and includes a speaker recognition system to use the interactive speaker highlighting interface module and the semi-supervised speaker diarization module to extract a plurality of single-speaker segments from a plurality of multi-speaker audio files, and store the extracted single-speaker segments in a searchable database. An example 15 includes the subject matter of example 14, wherein the speaker recognition system is to, by the speaker enrollment module, develop a speaker model for a person of interest, and use the speaker model to search the database of single-speaker segments for segments produced by the person of interest. An example 16 includes the subject matter of example 15, wherein the speaker recognition system is to output a list of multi-speaker audio files likely comprising a speech segment produced by the person of interest. An example 17 includes the subject matter of example 15, wherein the speaker recognition system is to rank each audio file in the list based on a likelihood of the audio file comprising a speech segment produced by the person of interest. An example 18 includes the subject matter of any of examples 12-17, wherein the interactive speaker highlighting interface module is to display a graphical representation of the multi-speaker audio file, display a plurality of interactive graphical controls to facilitate user selection of the seed segment, and display another interactive control to initiate identification by the system of the other speech segments likely produced by the speaker of the seed segment. An example 19 includes the subject matter of any of examples 12-18, wherein the interactive speaker highlighting interface module is to display a graphical indication of the user selection of the seed segment. An example 20 includes the subject matter of any of examples 12-19, wherein the interactive speaker highlighting interface module is to display a graphical representation of each of the algorithmically-identified other speech segments likely produced by the speaker of the seed segment.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, blocks, and the like are referred to as such for ease of discussion, and are not intended to imply that any specific implementation details are required. For example, any of the described modules and/or data structures may be combined or divided into sub-modules, sub-processes or other units of computer code, logic, or data as may be required by a particular design or implementation. In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure. This disclosure is to be considered as exemplary and not restrictive in character, and all changes and modifications that come within the spirit of the disclosure are desired to be protected.

The invention claimed is:

1. A method for a high precision segmentation of an audio file having an undetermined number of speakers, the method comprising:
   receiving a selection indicative of an audio event of interest in an electronic file that includes an undetermined number of different audio events;
   in response to the selection, creating a seed segment that is representative of less than or equal to ten seconds of the audio event of interest;
   by comparing features of the seed segment to a set of features extracted from the electronic file, separating the features extracted from the electronic file into a first subset that includes the features extracted from the seed segment and a second subset that includes features extracted from a remaining portion of the electronic file that does not include the seed segment;
   creating a seed model using, as training data, only the first subset and not the second subset;
   creating a non-seed model using, as training data, only the second subset and not the first subset;
   for a feature in the second subset, computing a score based on a comparison of the feature to the seed model and a comparison of the feature to the non-seed model;
   outputting a segment of the electronic file, wherein the segment includes the feature and at least one label indicative of the seed score and the non-seed score.

2. The method of claim 1, comprising displaying, in a window of a graphical user interface, a time-based graphical depiction of the audio event of interest with a time-based graphical depiction of the at least one segment of the remaining portion of the electronic file that is related to the audio event of interest.

3. The method of claim 1, comprising accessing the electronic file through a video player application, and in a graphical user interface, aligning a playing of a video portion of the electronic file with a time-based graphical depiction of the at least one segment of the remaining portion of the electronic file that is related to the audio event of interest.

4. The method of claim 1, comprising displaying, in a graphical user interface, a list of interactive elements including an interactive element representative of the electronic file, and in response to a selection of the interactive element, playing the at least one segment of the remaining portion of the electronic file that is related to the audio event of interest.

5. The method of claim 1, comprising determining an offset value based on a characteristic of the seed segment; adjusting the seed score based on the offset value; comparing the adjusted seed score to the non-seed score.

6. The method of claim 1, comprising computing both the seed score and the non-seed score using a likelihood log ratio.

7. The method of claim 1, wherein the offset value is determined in response to an interaction with a graphical user interface element.

8. The method of claim 1, comprising ranking a plurality of audio events in the electronic file based on comparing the adjusted seed score to the non-seed score.

9. The method of claim 1, wherein the audio event of interest comprises (i) speech or (ii) non-speech or (iii) a combination of (i) and (ii).

10. The method of claim 1, comprising receiving a plurality of user interface-based selections each corresponding to a different segment of the electronic file, and creating the seed segment based on the plurality of user interface-based selections.

11. The method of claim 1, comprising selecting a filter based on at least one of (i) a type associated with the seed segment or (ii) a characteristic of the seed segment and prior to the separating, using the selected filter to determine the set of features of the electronic file.

12. The method of claim 1, comprising creating a new model based on the audio event of interest and at least one segment of the remaining portion of the electronic file that matches the audio event of interest.

13. The method of claim 12, comprising using the new model, performing audio event recognition on a new electronic file.

14. The method of claim 12, comprising using the new model, searching a audio files for audio events of a same type as the audio event of interest, and outputting a list of audio files arranged according to a likelihood that the audio files comprise an audio event of the same type as the audio event of interest.

15. The method of claim 1, wherein the selection of the audio event of interest is received in response to an interaction with a graphical user interface element.

16. The method of claim 1, wherein the audio event of interest comprises a speech segment produced by a person of interest and the method comprises outputting a list of multi-speaker audio files that comprise speech produced by the person of interest.

17. The method of claim 16, comprising ranking each audio file in the list based on a likelihood of the audio file comprising speech produced by the person of interest.

18. The method of claim 1, comprising displaying a graphical representation of the electronic file, displaying a plurality of interactive graphical user interface elements to facilitate user selection of the seed segment and visualization of at least one segment of the remaining portion of the electronic file that matches the audio event of interest.

19. The method of claim 1, comprising displaying, in a graphical user interface, an interactive graphical element representative of the seed segment.

20. The method of claim 1, comprising displaying, in a graphical user interface, an interactive graphical element representative of a segment of the remaining portion of the electronic file that matches the audio event of interest.

* * * * *